United States Patent [19]

Okami

[11] Patent Number: 5,384,075
[45] Date of Patent: Jan. 24, 1995

[54] ORGANOPOLYSILOXANE COMPOSITION AND PROCESS FOR PRODUCING CURED PRODUCT OF THE SAME

[75] Inventor: Takehide Okami, Annaka, Japan

[73] Assignee: Shin-Etsu Chemical Co., Ltd., Tokyo, Japan

[21] Appl. No.: 37,588

[22] Filed: Mar. 26, 1993

[30] Foreign Application Priority Data

Mar. 27, 1992 [JP] Japan .................................. 4-140876

[51] Int. Cl.$^6$ ............................................ B29C 45/00
[52] U.S. Cl. ............................... 252/511; 252/513; 252/514; 528/15; 528/31; 524/431; 524/432; 524/440; 524/441; 524/266; 524/268; 524/588
[58] Field of Search ..................... 252/511, 513, 514; 528/15, 31; 524/266, 268, 588, 431, 432, 440, 441

[56] References Cited

U.S. PATENT DOCUMENTS

| | | | |
|---|---|---|---|
| 4,077,943 | 3/1978 | Sato et al. | 528/15 |
| 4,477,641 | 10/1984 | Matsumoto | 528/31 |
| 4,604,424 | 8/1986 | Cole et al. | 528/31 |
| 4,777,205 | 10/1988 | La Scola | 252/511 |
| 5,104,919 | 4/1992 | Okami et al. | 524/94 |
| 5,209,872 | 5/1993 | Takahashi et al. | 252/511 |
| 5,217,651 | 7/1993 | Nagaoka | 528/31 |

*Primary Examiner*—John C. Bleutge
*Assistant Examiner*—Mark D. Sweet
*Attorney, Agent, or Firm*—Oblon, Spivak, McClelland, Maier & Neustadt

[57] ABSTRACT

An addition-curable type organopolysiloxane composition having a volume resistivity of $10^7$ Ωcm or below, comprising (A) an organopolysiloxane having at least two alkenyl group in its molecule and a viscosity at 25° C. of from 100 to 200,000 cSt, (B) an organohydrogenpolysiloxane having at least two silicon-bonded hydrogen atoms in its molecule, (C) a platinum group metal catalyst, (D) an organosilicon compound which has at least one silicon-bonded hydrogen atom in its molecule and in which at least one member selected from the group consisting of epoxy group-containing organic groups and alkoxy groups is attached to a silicon atom, and (E) an electrically conductive filler. This composition can be cured by an ultra high frequency heating system to form an adhesive cured product. It is therefore possible to obtain cured products with stable physical properties under constantly fixed conditions irrespective of the heat capacity of adherends.

6 Claims, 1 Drawing Sheet

ORGANOPOLYSILOXANE COMPOSITION AND PROCESS FOR PRODUCING CURED PRODUCT OF THE SAME

BACKGROUND OF THE INVENTION

1. Field of the Invention

The present invention relates to an addition-curable type organopolysiloxane composition and a process for producing a cured product of said composition.

2. Description of the Prior Art

Heretofore, addition-curable type adhesive compositions whose main component is an organopolysiloxane having a silicon-bonded vinyl group have been known, and there has been a proposal to use various adhesion-imparting agents together with such composition in order to improve adhesive properties (Refer to Japanese Patent Publication (KOKOKU) Nos. 53-13508, 53-21026 and 59-5219).

However, addition-curable type adhesive compositions are, in general, cured by heating and, therefore, have the disadvantages as follows. Where the heat capacity of an adherend is high, more energy is required for heating the adherend than for heating the adhesive composition. Furthermore, adhesive properties are lowered where temperature rise at the interface of adhesion is insufficient.

SUMMARY OF THE INVENTION

Accordingly, it is an object of this invention to provide a process for producing an adhesive cured product by which an adherend with a high heat capacity can be adhered by formation of an adhesive cured product on the adherend surface while using thermal energy in a quantity similar to that for an adherend with a low heat capacity.

According to the present invention, there is provided an organopolysiloxane composition having a volume resistivity of $10^7$ Ωcm or below and comprising:

(A) an organopolysiloxane having at least two alkenyl groups in its molecule and a viscosity at 25° C. of from 100 to 200,000 cSt, (B) an organohydrogenpolysiloxane having at least two silicon-bonded hydrogen atoms in its molecule, (C) a platinum group metal catalyst, (D) an organosilicon compound which has at least one silicon-bonded hydrogen atom in its molecule and in which at least one member selected from the group consisting of epoxy group-containing organic groups and alkoxy groups is attached to a silicon atom, and (E) an electrically conductive filler.

According to the present invention, there is also provided a process for producing an adhesive cured product comprising the step of irradiating the aforesaid composition with a microwave of from 900 to 5,000 MHz in frequency to cure the composition.

In the present invention, in connection with the control of the volume resistivity of the addition-curable type organopolysiloxane composition to a value of $10^7$ Ωcm or below, the composition shows a markedly improved microwave absorptivity. Accordingly, where an adhesive cured product is produced by an ultra high frequency heating system (hereinafter abbreviated to UHF heating) using said composition, cure takes place independently of the heat capacity of the adherend and, in addition, defective cure at the interface of adhesion is effectively prevented.

Therefore, the composition according to the present invention is highly useful for such applications as structural sealant for construction, heat-insulating multilayer glass for construction, laminated safety glass used at inspection windows of mechanical, chemical or other equipment, and the like. Namely, the composition of the invention is able to be used effectively even where an adherend has a high heat capacity and it is difficult to heat the whole area of adhesion or where heating of the adhesive area may break the function of surrounding component parts.

DETAILED DESCRIPTION OF THE INVENTION

Figure 1:
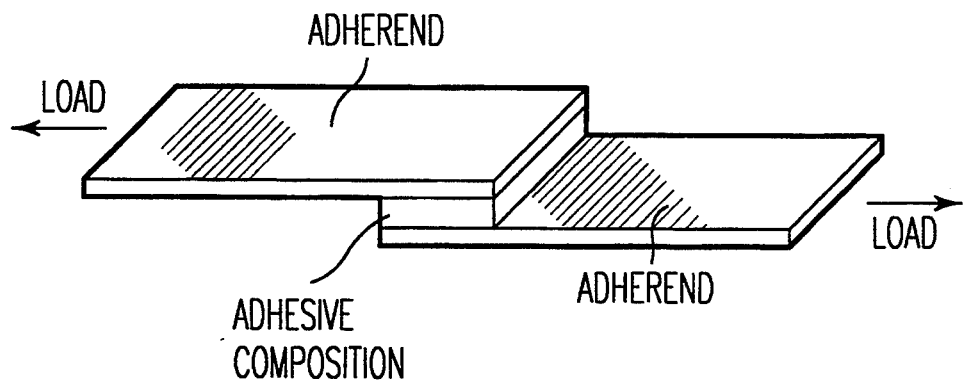
FIG. 1 shows a sample for adhesion of glass fabricated in Example 1.

Organopolysiloxane composition (A) Alkenyl group-containing organopolysiloxane The organopolysiloxane as component (A) of the composition according to the present invention has at least two alkenyl groups in its molecule. The alkenyl groups include, for example, lower alkenyl groups such as vinyl, allyl, methacryl, hexenyl and the like. As other organic groups than the alkenyl groups, unsubstituted or substituted monovalent hydrocarbon groups of from 1 to 10, preferably from 1 to 8, carbon atoms are incorporated in the composition. Such hydrocarbon groups include, for example, alkyl groups such as methyl, ethyl, propyl, butyl, and the like; cycloalkyl groups such as cyclohexyl and the like; aryl groups such as phenyl, tolyl and the like; aralkyl groups such as benzyl, phenylethyl, and the like; and groups derived from these groups by substitution of a halogen atom or the like for part or all of hydrogen atoms of these groups, such as, for example, chloromethyl, 3,3,3-trifluoropropyl and the like.

In addition, the organopolysiloxane has a viscosity at 25° C. in the range from 100 to 200,000 cSt, and a polymerization degree corresponding to the viscosity. Namely, where the viscosity is above this range, workability of the composition or the like is impaired. Where the viscosity is below the range, on the other hand, there may arise disadvantages as to properties of cured products or the like.

In the present invention, the organopolysiloxane as described above may be used either singly or in combination of two or more. The molecular structure of the organopolysiloxane is preferably linear, but may be branched in part. Suitable examples of the organopolysiloxane Of the component (A) as above are represented by organopolysiloxanes having the following formulas (1) to (3):

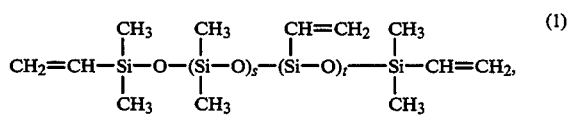

-continued

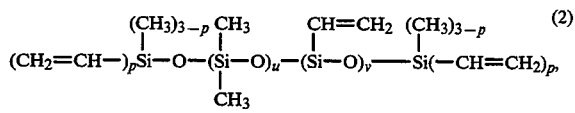

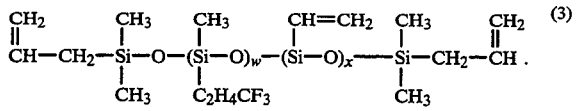

In the above formulas, p is 2 or 3; s, u and w are each a positive integer; and t, v and x are each either 0 or a positive integer.

(B) Organohydrogenpolysiloxane

The organohydrogenpolysiloxane as component (B) of the composition according to the present invention acts as a crosslinking agent for the alkenyl group-containing organopolysiloxane of component (A) described above. As the organohydrogenpolysiloxane of component (B), an organohydrogenpolysiloxane having at least two silicon-bonded hydrogen atoms in its molecule is used. Namely, alkenyl groups in the above-described component (A) perform an addition reaction with SiH groups in the component (B) to form an adhesive cured product which is a rubber-like elastic substance.

In the organohydrogenpolysiloxane, the aforesaid hydrogen atoms may each be attached either to a silicon atom located at a terminal end of the molecule or to a silicon atom located at an intermediate part of the molecular chain. In addition, organic groups which may be attached to such silicon atom include, for example, those groups other than alkenyl which have been exemplified in the above description of the organopolysiloxane of component (A). The organohydrogenpolysiloxane may be linear, branched or cyclic in structure, and may be a mixture of organohydrogenpolysiloxanes of these structures. The organohydrogenpolysiloxanes preferably have a polymerization degree of 300 or below. Suitable examples of the organohydrogenpolysiloxane are given below.

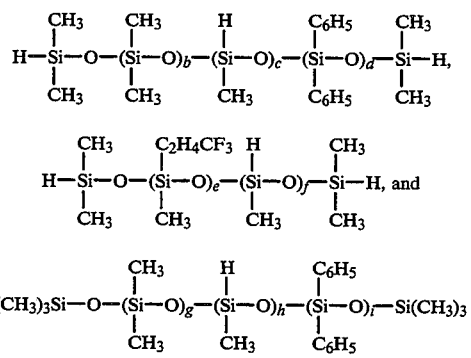

wherein in the above formulas, b, c, d, e, f, g and i are each either 0 or a positive integer, and h is an integer of 2 or above; and

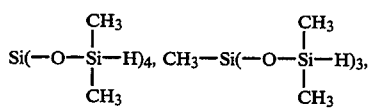

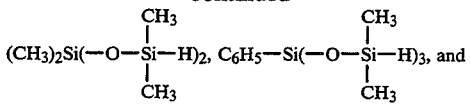

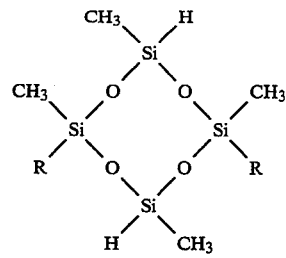

wherein in the above formulas, R is a hydrogen atom, methyl group, propyl group or trimethylsiloxy group.

The organohydrogenpolysiloxane is used in an amount sufficient for supplying from 0.6 to 6.0 silicon-bonded hydrogen atoms per one alkenyl group contained in the above-described organopolysiloxane of component (A), and is preferably used in a proportion such that the molar ratio of SiH groups to alkenyl groups is from 1.2 to 4.0.

(C) Platinum group metal catalyst

The platinum group metal catalyst of component (C) is a catalyst for the addition reaction between the above-described alkenyl groups and SiH groups, and acts as a cure accelerator. As a catalyst for such use, there are platinum, palladium and rhodium catalysts, of which any one may be used. In the present invention, particularly preferred are platinum catalysts. The preferable, but not limitative, catalysts for use in the present invention include, for example, platinum black, a catalyst comprising solid platinum supported on a carrier such as alumina, silica or the like, chloroplatinic acid, alcohol-modified chloroplatinic acid, a chloroplatinic acid-olefin complex, and the like.

In use of these catalysts, it is preferable, in the case of a solid catalyst, to disintegrate the catalyst for obtaining better dispersibility or to make the carrier therefor have a reduced particle diameter and an increased specific surface area. In the case of a complex of chloroplatinic acid with an olefin, it is preferable to use the acid and olefin by dissolving them in a solvent such as alcohol, ketone, ether or hydrocarbon solvents.

These catalysts may be used in a so-called catalytic amount, whereby a desired cure rate is obtainable. From an economic point of view or in order to obtain a favorable cured product, however, it is preferable to use the catalyst in such proportions as follows. Those catalysts which are miscible with the siloxane component, such as platinic acid, are preferably used in an amount of from 0.1 to 100 ppm (in terms of platinum) based on the total amount of the aforesaid components (A) and (B). On the other hand, solid catalysts such as platinum black and the like are preferably used in an amount of from 20 to 500 ppm (in terms of platinum). (D) Organosilicon compound In the present invention, the organosilicon compound of component (D), acting as an adhesion-imparting agent, is a compound which has at least one silicon-bonded hydrogen atom in its molecule and in which at least one member selected from the group consisting of epoxy group-containing organic groups and alkoxy groups is attached to a silicon atom. Namely, the organosilicon compound is taken into a cured product because of the SiH group present in its molecule, and the presence of the epoxy or alkoxy group enhances the adhesive properties of the cured product.

In the organosilicon compound, the alkoxy groups include, for example, methoxy, ethoxy, methoxymethylenoxy, methoxyethylenoxy, ethoxyethylenoxy, glycidyloxy, and the like.

On the other hand, the epoxy group-containing organic groups include, for example, those having the following formulas:

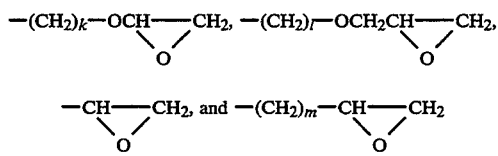

wherein in the above formulas, k, l and m are each an integer from 1 to 6.

The alkoxy group and the epoxy group-containing organic group may be contained at the same time in the molecule of the organosilicon compound, and may be contained in respective numbers of two or more.

In the present invention, the organosilicon compounds as above are known per se. For example, those having an alkoxysiloxy group (Refer to Japanese Patent Publication No. 53-21026), those having an epoxy group-containing hydrocarbon group (See Japanese Patent Publication No. 53-13508), those having an alkoxysiloxy group and an epoxy group-containing hydrocarbon group (Refer to Japanese Patent Publication No. 59-5219) and the like are known, and these organosilicon compounds can be used as component (D) in the present invention. Among such organosilicon compounds, particularly preferred are those having the following formulas:

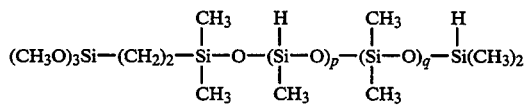

wherein p and q are each a positive integer, for example, p=3, and q=7,

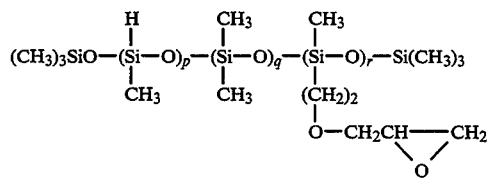

wherein p, q and r are each a positive integer, for example, p=2, q=6, and r=2,

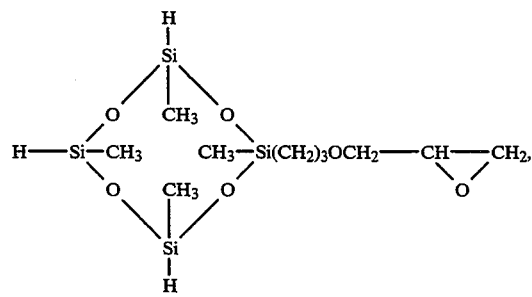

and

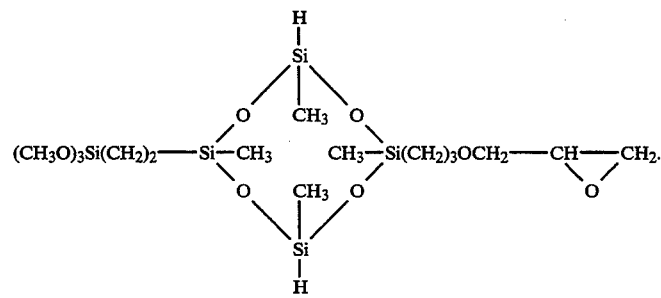

The organosilicon compound is preferably used in an amount of from 0.5 to 20 parts by weight, particularly from 1 to 10 parts by weight, per 100 parts by weight of the above-described organopolysiloxane of component (A). If said amount is less than 0.5 parts by weight, the cured product obtained is poor in self-adhesive strength. Use of the organosilicon compound in an amount of above 20 parts by weight, on the other hand, impairs properties of the composition and is disadvantageous on an economic basis.

(E) Electrically conductive filler

In the present invention, the electrically conductive filler of component (E) is used to control the volume resistivity of the composition to $10^7$ $\Omega$cm or below, thereby enhancing microwave absorptivity of the composition and enabling formation of a cured product by UHF heating.

As the electrically conductive filler, there can be used any filler that is able to control the volume resistivity of the composition to $10^7$ $\Omega$cm or below. However, conductive carbon particles, metal powders and conductive metal oxides are preferably used. Suitable examples of the conductive carbon particles include conductive furnace black (CF), super-conductive furnace black (SCF), extra-conductive furnace black (XCF), conductive channel black (CC) and acetylene black (AB), as well as furnace black, channel black and the like which have been heat-treated at high temperatures of about 1500° C. As the metal powder, on the other hand, aluminum powder, nickel powder, silver powder and the like are suited. As the conductive metal oxide, furthermore, zinc oxide-aluminum oxide based conductive zinc white and titanium oxide-tin oxide-antimony oxide based white conductive powder are applicable. In the present invention, acetylene black is used most preferably, from the viewpoint of not impairing the curing properties of the composition.

The component (E) is used in an amount sufficient for controlling the volume resistivity of the composition to $10^7 \Omega cm$ or below. In general, the amount of component (E) used per 100 parts by weight of the aforesaid component (A) is from 50 to 300 parts by weight in the case of metal powders, and is from 5 to 50, preferably from 10 to 30, parts by weight in the case of conductive carbon particles.

Other ingredients:

The adhesive organopolysiloxane composition of the present invention can be obtained by mixing uniformly the above-described components (A) to (E) in predetermined quantities, and the composition may be admixed with filler and other compounding ingredients according to the intended use thereof.

As filler, for instance, all of those fillers normally used in addition-type silicone rubber compositions are usable. Specifically, fumed silica, precipitated silica, silica treated to be hydrophobic, titanium dioxide, ferric oxide, aluminum oxide, zinc oxide, ground quartz, diatomaceous earth, calcium silicate, talc, bentonite, asbestos, glass fibers, organic fibers and the like are used, either singly or in combination of two or more. Such filler may be compounded in an arbitrary quantity, as far as it does not spoil the object of the present invention. In general, the filler is used in an amount of 600 parts by weight or below per 100 parts by weight of the organopolysiloxane of component (A). Particularly, fumed silica is preferably used in an amount of 25 parts by weight or below, whereas the amount of alumina or the like is preferably in the range from 300 to 500 parts by weight. Thus, the preferable addition amount of a filler varies depending on the oil absorption, surface area and specific gravity of the filler.

Besides, in order to augment the strength of the cured product, an organopolysiloxane of a resin structure containing $SiO_2$ units, $Vi(R')_2-SiO_{0.5}$ units and $R'_3-SiO_{0.5}$ units (wherein Vi is vinyl group, and R' is a monovalent hydrocarbon group not containing unsaturated aliphatic groups) (Refer to Japanese Patent Publication Nos. 38-26771 and 45-9476, or the like) can also be added to the composition of the present invention. Further, for the purpose of controlling the cure rate of the composition, an organopolysiloxane having Vi(R')SiO units (wherein R' is the same as above) (See Japanese Patent Publication No. 48-10947), an acetylene compound disclosed in U.S. Pat. No. 3,445,420, an ionic compound of a heavy metal disclosed in U.S. Pat. No. 3,532,649, and the like can be compounded in the composition. Also, no-functional organopolysiloxanes may be added to the composition of the invention, in order to enhance thermal shock resistance, flexibility and the like of the cured product of the composition.

Furthermore, heat resistance improver such as cerium oxide, etc., flame retardant such as titanium oxide, benzotriazole, zinc carbonate, manganese carbonate, etc., addition reaction controlling agent such as vinyl group-containing siloxane, acetylene compound, etc., foaming agent, and the like can suitably be compounded in the composition of the present invention.

In the present invention, the amounts of the various additives which are compounded as required should be such that the volume resistivity of the composition is not impaired.

Formation of cured product

The adhesive organopolysiloxane composition of the present invention, when irradiated with microwaves in a frequency range of 900-5,000 MHz, called ultra high frequencies (usually referred to as UHF), well absorbs the microwave to generate heat, thereby forming a cured product. Accordingly, the composition easily adheres and cures even where the composition is cured in the state of being applied to an adherend having a high heat capacity. This means the advantage that the composition is able to be used even where the adherend is glass, engineering plastic or the like which has low thermal conductivity.

In carrying out the UHF heating, a generally known UHF vulcanizer may be used. Ordinarily, after coating or sealing an adherend with the adhesive organopolysiloxane composition of the present invention, the adherend together with the composition is fed into a UHF heating zone equipped with a high-frequency oscillator having an oscillation frequency of 2,450±50 MHz or 915±25 MHz, which frequency is normally allocated to this kind of heaters, to irradiate the composition with high-frequency waves. The composition is thereby heated uniformly to around 150° C., accompanied by uniform progress of cure and a uniform temperature rise at the adhesive surface. Therefore, internal stress and strain generated at the time of curing are reduced, and stability of adhesion is increased. The cured product thus formed may be subjected to after-heating, for stabilizing physical properties and adhesive properties of the cured product.

EXAMPLES

Some examples of the present invention and comparative examples will now be described below, in which "parts" means "parts by weight" and viscosity is given in values measured at 25° C.

Example 1, Comparative Example 1

One hundred parts of a dimethylpolysiloxane having the following average composition formula:

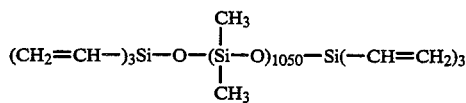

and a viscosity of 100,000 cSt and blocked by trivinylsilyl group at both terminal ends of its molecular chain, 0.1 part of an octanol solution of chloroplatinic acid (platinum content: 2 wt.%), 0.01 part of 3-methylhydroxyl-butyne (controlling agent), 50 parts of heavy silica, and 10 parts of an extra conductive furnace black (produced by Lion K.K., commercial name: Ketjen Black EC) were mixed uniformly. To the uniform mixture thus obtained, 2.5 parts of an organohydrogenpolysiloxane having the following average composition formula:

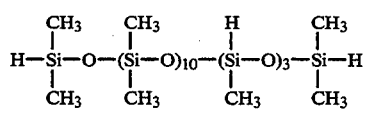

and 3.0 parts of an organosilicon compound (adhesion-imparting agent) having the following formula:

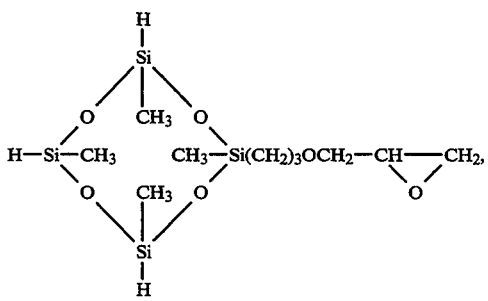

were added, and the resulting admixture was kneaded uniformly to prepare an adhesive composition (i).

Next, using the composition thus obtained, a sample for adhesion of glass as shown in FIG. 1 was formed. The sample was placed in a 50-cm UHF oscillating device designed to oscillate a microwave with a frequency of 2,450±50 MHz, and irradiation with the microwave was carried out for 15 minutes, to obtain a cured silicone rubber. Then, adhesive strength under shear and cohesive failure ratio of the cured silicone rubber were measured. In addition, physical properties of the cured product was measured according to JIS K 6301. The results are shown in Table 1 (Example 1).

For comparison, the composition as above was cured by keeping it at a temperature of 120° C. in a dryer, and physical properties of the cured product were measured in the same manner as above.

Further, a comparative composition (A) was prepared in the same manner as above except for not using Ketjen Black EC. The comparative composition (A) was subjected to UHF curing and dryer curing in the same manner as above, followed by measurement of adhesive strength under shear and physical properties of the cured product thus obtained (Comparative Example 1). The results are shown in Table 1.

TABLE 1

|  | Composition (i) |  |  | Composition (A) |  |
|---|---|---|---|---|---|
| Volume resistivity Ωcm | $10^6$ |  |  | $10^{15}$ |  |
| UHF cure | 15 min |  |  | 15 min |  |
| 120° C. Heat cure | — | 15 min | 60 min | — | 60 min |
| Cured state | A | B | A | B | A |
| Hardness | 40 | insufficiently cured | 40 | not cured | 34 |
| Elongation % | 380 |  | 360 |  | 330 |
| Tensile strength kgf/cm² | 35 |  | 36 |  | 21 |
| Adhesive strength under shear kgf/cm² | 18 | 3 | 17 | — | 15 |
| Cohesive failure ratio % | 100 | — | 100 | — | 100 |

Notes:
Cured state - A: completely cured B: uncured inside

Hardness was measured using a type A spring hardness tester according to JIS K 6301.

Example 2, Comparative Example 2

One hundred parts of a dimethylpolysiloxane blocked by dimethylvinylsilyl group at both terminal ends of its molecular chain and having a viscosity of 30,200 cSt, 0.1 part of an octanol solution of chloroplatinic acid (platinum content: 2 wt. %), 0.15 part of 3-methyl-3-hydroxy-1-butyne, and 20 parts of acetylene black (produced by Denki-Kagaku K.K., commercial name: Denka Black HS-100) were mixed uniformly.

To the uniform mixture thus obtained, 0.8 part of a methylhydrogenpolysiloxane having the following average composition formula:

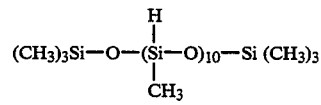

and 3.0 parts of an organosilicon compound (adhesion-imparting agent) having the following formula:

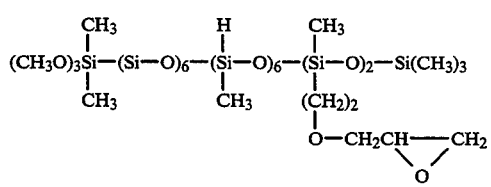

were added, followed by mixing uniformly to prepare an adhesive composition (ii). The volume resistivity of the composition was $10^{-4}$ Ωcm.

Next, the composition prepared as above was cured by irradiating with the same UHF as in Example 1 for 10 minutes. Physical properties of the cured product thus obtained were measured in the same manner as in Example 1.

Figure 2:
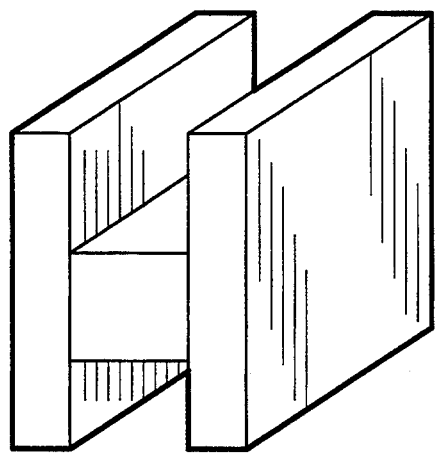
FIG. 2 shows an H-type block sample for adhesion of glass fabricated in Example 2.

Using the adhesive composition obtained as above, an H-type block sample for adhesion of glass as shown in FIG. 2 was fabricated according to JIS A 5758 by use of Teflon spacers. The sample was irradiated-with UHF for 15 minutes, and the resulting cured product was subjected to measurement of physical properties. The results are shown in Table 2.

For comparison, the adhesive composition prepared as above was cured by heating to 120° C. in a dryer, and physical properties of the cured product thus obtained were measured in the same manner as above (Comparative Example 2).

TABLE 2

|  |  | UHF cure | 120° C. Heat cure |  |
|---|---|---|---|---|
|  | Curing conditions | 15 min | 15 min | 60 min |
| Sheet | Hardness | 40 | unsatisfactorily cured | 38 |
|  | Elongation % | 330 |  | 350 |
|  | Tensile strength kgf/cm² | 23 |  | 22 |
| H-type block | 50% Modulus kgf/cm² | 3.7 | uncured | 3.5 |
|  | Maximum load kgf/cm² | 9.1 |  | 8.8 |
|  | Elongation at maximum load % | 150 |  | 130 |
|  | Cohesive failure ratio % | 100 |  | 100 |

We claim:

1. An organopolysiloxane composition having a volume resistivity of $10^7$ Ωcm or below, comprising:
   (A) an organopolysiloxane having at least two alkenyl groups in its molecule and a viscosity at 25° C. of from 100 to 200,000 cSt,
   (B) an organohydrogenpolysiloxane having at least two silicon-bonded hydrogen atoms in its molecule,
   (C) a platinum group metal catalyst,
   (D) an organosilicon compound which has at least one silicon-bonded hydrogen atom in its molecule and in which at least one member selected from the group consisting of epoxy group-containing organic groups and alkoxy groups is attached to a silicon atom, and
   (E) an electrically conductive filler.

2. The composition according to claim 1, wherein the electrically conductive filler (E) is at least one member selected from the group consisting of conductive carbon particles, metal powders and conductive metal oxides.

3. The composition according to claim 1, wherein the organosilicon compound (D) has at least one member selected from the group consisting of methoxy, ethoxy, methoxymethylenoxy, methoxyethylenoxy, ethoxyethylenoxy and glycidyloxy groups, as an alkoxy group directly attached to a silicon atom.

4. The composition according to claim 1, wherein the organosilicon compound (D) has at least one member selected from the group consisting of:

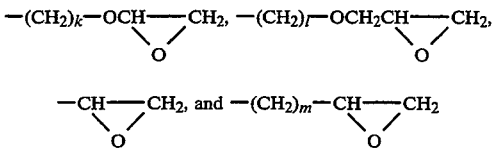

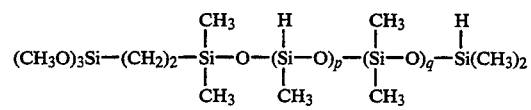

wherein in the formulas, k, l and m are each an integer from 1 to 6, as an epoxy group-containing organic group.

5. The composition according to claim 1, wherein the organosilicon compound (D) has at least one member selected from the group consisting of:

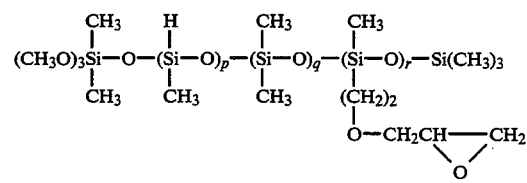

wherein p and q are each a positive integer,

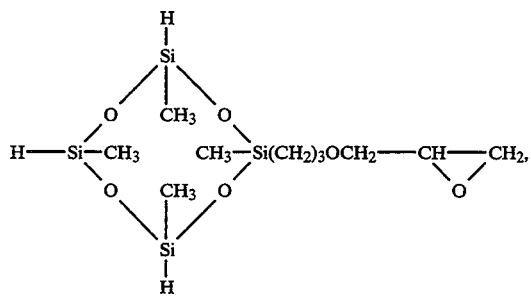

wherein p, q and r are each a positive integer,

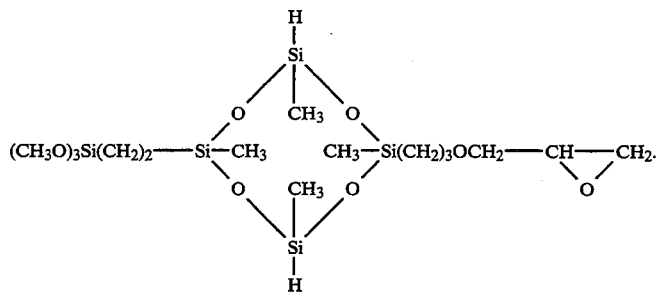

and

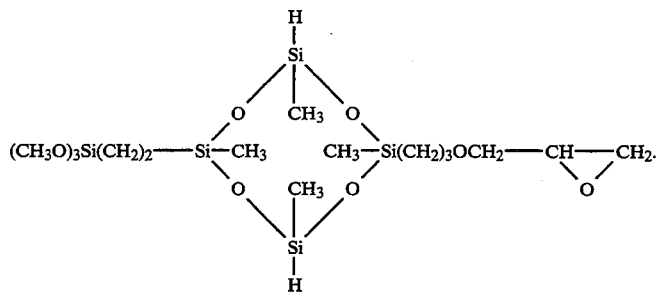

6. The composition according to claim 1, wherein the organosilicon compound (D) is compounded in an amount of from 0.5 to 20 parts by weight per 100 parts by weight of the organopolysiloxane (A).